US012752184B2

(12) United States Patent
Chen

(10) Patent No.: US 12,752,184 B2
(45) Date of Patent: Oct. 6, 2026

(54) GAMEPAD

(71) Applicant: VIVO MOBILE COMMUNICATION CO., LTD., Guangdong (CN)

(72) Inventor: Yuanqiang Chen, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 231 days.

(21) Appl. No.: 18/618,919

(22) Filed: Mar. 27, 2024

(65) Prior Publication Data

US 2024/0226722 A1 Jul. 11, 2024

Related U.S. Application Data

(63) Continuation of application No. PCT/CN2022/120597, filed on Sep. 22, 2022.

(30) Foreign Application Priority Data

Sep. 29, 2021 (CN) .......................... 202111150434.6

(51) Int. Cl.
*A63F 13/24* (2014.01)

(52) U.S. Cl.
CPC .................................... *A63F 13/24* (2014.09)

(58) Field of Classification Search
CPC ....................................................... A63F 13/24
See application file for complete search history.

(56) References Cited

U.S. PATENT DOCUMENTS 11,344,809 B2 * 5/2022 Kando ................. G06F 3/04842
12,263,400 B2 * 4/2025 Lake ........................ A63F 13/24
12,274,933 B2 * 4/2025 Lu ............................ A63F 13/23
2006/0098116 A1 * 5/2006 Manico ................ H04N 23/661
348/E5.025

(Continued)

FOREIGN PATENT DOCUMENTS

CN 2874937 Y 2/2007
CN 104353239 A 2/2015

(Continued)

OTHER PUBLICATIONS

Gamesir X2 Type C Mobile Gaming Controller—Unboxing, Review and Test, "https://www.youtube.com/watch?v=H8BqTycA9_4" (PUBG, NFS) (Year: 2021).*

(Continued)

*Primary Examiner* — Reginald A Renwick
(74) *Attorney, Agent, or Firm* — BROOKS KUSHMAN P.C.

(57) ABSTRACT

A gamepad including a housing and an interface support. The housing is provided with an accommodation space, the housing is provided with an opening, and the opening communicates with the accommodation space. The interface support is accommodated in the accommodation space and is movably connected to the housing, the interface support is provided with an interface for plugging into an electronic device, and the interface protrudes out of the housing through the opening. The interface support is capable of moving in a first direction relative to the housing to drive the interface to move in the first direction, and the first direction is perpendicular to a protruding direction of the interface.

12 Claims, 9 Drawing Sheets

(56) References Cited

U.S. PATENT DOCUMENTS

2006/0237209 A1* 10/2006 Horinouchi ........... G06F 1/1677 174/50
2012/0088582 A1* 4/2012 Wu ..................... A63F 13/5255 463/37
2013/0029763 A1 1/2013 Zhou
2013/0157764 A1* 6/2013 Joynes .................... A63F 13/23 463/37
2014/0097793 A1 4/2014 Wurtz
2014/0206451 A1* 7/2014 Helmes ................... A63F 13/23 463/39
2014/0274394 A1* 9/2014 Willis ................... G06F 1/1626 463/37
2015/0018101 A1* 1/2015 Schoenith ............... A63F 13/98 463/37
2015/0281422 A1* 10/2015 Kessler ................ H04M 11/007 455/557
2015/0333789 A1 11/2015 An
2016/0107082 A1* 4/2016 Song ....................... A63F 13/98 463/37
2016/0166929 A1 6/2016 Rihn et al.
2016/0231773 A1* 8/2016 Inoue ...................... G06F 3/005
2018/0193731 A1* 7/2018 Oizumi ................... A63F 13/23
2018/0207484 A1* 7/2018 Briggs ................... G16H 40/67
2018/0375977 A1 12/2018 Deng et al.
2021/0197078 A1* 7/2021 Yildiz ................... G06F 1/1613
2021/0275907 A1 9/2021 Khaira et al.
2021/0299553 A1* 9/2021 Lu ......................... G06F 1/1632
2021/0308566 A1* 10/2021 Kong ...................... A63F 13/92
2022/0080300 A1* 3/2022 Lu ........................... A63F 13/24
2023/0105244 A1* 4/2023 Lu ........................... A63F 13/24 463/37
2023/0105605 A1* 4/2023 Lu ........................... A63F 13/24 463/37
2024/0165502 A1* 5/2024 Lu ........................... A63F 13/24
2024/0198213 A1* 6/2024 Li ........................... A63F 13/98

FOREIGN PATENT DOCUMENTS

| | | | |
|---|---|---|---|
| CN | 204215354 | U | 3/2015 |
| CN | 204362114 | U | 5/2015 |
| CN | 106714922 | A | 5/2017 |
| CN | 206273309 | U | 6/2017 |
| CN | 207708482 | U | 8/2018 |
| CN | 208319955 | U | 1/2019 |
| CN | 110058654 | A | 7/2019 |
| CN | 209490464 | U | 10/2019 |
| CN | 111163195 | A | 5/2020 |
| CN | 210517260 | U | 5/2020 |
| CN | 112516586 | A | 3/2021 |
| CN | 213407704 | U | 6/2021 |
| CN | 113452823 | A | 9/2021 |
| CN | 113750520 | A | 12/2021 |
| JP | 2014049801 | A | 3/2014 |
| JP | 2015217937 | A | 12/2015 |
| JP | 2019160324 | A | 9/2019 |

OTHER PUBLICATIONS

First Japanese Office Action for Japanese Patent Application No. 2024-518907 dated Jan. 30, 2025. 6 pages.
First Office Action for Chinese Application No. 202111150434.6, dated Dec. 27, 2023, 10 Pages.
International Search Report and Written Opinion for Application No. PCT /CN2022/120597, dated Dec. 23, 2022, 9 Pages.

* cited by examiner

GAMEPAD

CROSS-REFERENCE TO RELATED APPLICATIONS

This application is a continuation of International Application No. PCT/CN2022/120597 filed on Sep. 22, 2022, which claims priority to Chinese Patent application Ser. No. 202111150434.6 filed on Sep. 29, 2021, which are incorporated herein by reference in their entireties.

TECHNICAL FIELD

This application pertains to the field of electronic device technologies, and specifically, relates to a gamepad.

BACKGROUND

Electronic devices such as mobile phones and tablet computers have become quite common tools in people's daily lives, and mobile games derived from electronic devices such as mobile phones are particularly popular among people. Currently, mobile games impose increasingly high requirements for operations by users, and people often use gamepads to improve game experience. However, existing gamepads have a simple structure, and different models of mobile phones usually differ in designs of thicknesses and interface locations of the mobile phones. As a result, the gamepads cannot adapt to different models of mobile phones, limiting application of the gamepads.

SUMMARY

An objective of embodiments of this application is to provide a gamepad.

An embodiment of this application provides a gamepad, including:

- a housing, where the housing is provided with an accommodation space, the housing is provided with an opening, and the opening communicates with the accommodation space; and
- an interface support, where the interface support is accommodated in the accommodation space and is movably connected to the housing, the interface support is provided with an interface for plugging into an electronic device, and the interface protrudes out of the housing through the opening, where
- the interface support is capable of moving in a first direction relative to the housing to drive the interface to move in the first direction, where the first direction is perpendicular to a protruding direction of the interface.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without making creative efforts shall fall within the protection scope of this application.

The terms "first", "second", and the like in this specification and the claims of this application are used to distinguish between similar objects rather than to describe a specific order or sequence. It should be understood that the data used in this way is interchangeable in appropriate circumstances, so that the embodiments of this application can be implemented in an order other than the order illustrated or described herein. In addition, the objects distinguished by "first", "second", and the like usually belong to one category, and the number of objects is not limited. For example, there may be one or more first objects. In addition, in this specification and the claims, "and/or" represents at least one of connected objects, and the character "/" typically represents an "or" relationship between the associated objects.

An embodiment of this application provides a gamepad.

As shown in FIG. 1 to FIG. 10*b*, the gamepad provided in this embodiment of this application includes a housing 10 and an interface support 20. The housing 10 is provided with an accommodation space, the housing 10 is provided with an opening, and the opening communicates with the accommodation space. The interface support 20 is accommodated in the accommodation space and is movably connected to the housing 10, the interface support 20 is provided with an interface 23 for plugging into an electronic device, and the interface 23 protrudes out of the housing 10 through the opening on the housing 10. The interface support 20 is capable of moving in a first direction relative to the housing

10 to drive the interface 23 to move in the first direction. The first direction is perpendicular to a protruding direction of the interface 23.

It should be noted that the opening may be provided on a first side surface of the housing 10, where the first side surface may be any side surface of the housing 10 and is not a specific side surface. The interface 23 on the interface support 20 extends out of the opening on the first side surface and is exposed outside the housing 10, so that the gamepad can be plugged into the electronic device through the interface 23 exposed outside the housing 10. The interface 23 may be a communication interface, or the interface 23 may be a charging interface or the like.

Figure 1:
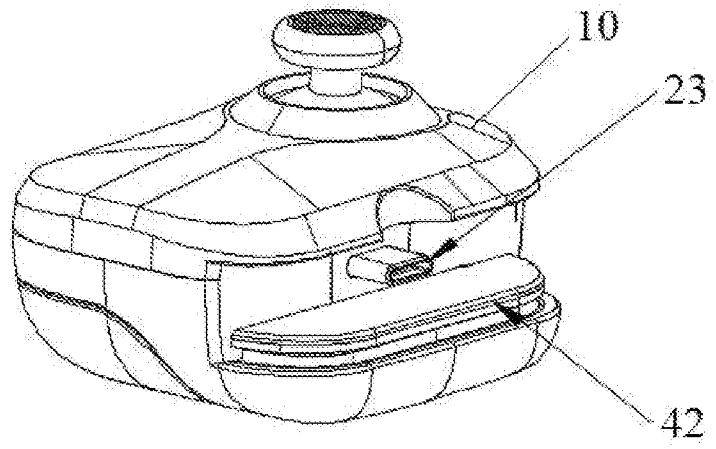
FIG. 1 is a structural diagram of a gamepad according to an embodiment of this application.

In this embodiment of this application, the interface support 20 is movably connected to the housing 10, so that the interface support 20 can move in the first direction relative to the housing 10, and movement of the interface support 20 can drive the interface 23 to move in the first direction. The first direction is a direction perpendicular to the protruding direction of the interface 23. It should be noted that as shown in FIG. 1, the first direction may include an upward direction perpendicular to the protruding direction of the interface 23, and also include a downward direction perpendicular to the protruding direction of the interface 23, meaning that the interface 23 can reciprocate in the direction perpendicular to the protruding direction of the interface 23. In this way, a location of the interface 23 on the gamepad is not fixed. The gamepad can adapt to electronic devices of different models and thicknesses through adjustment of the location of the interface 23. This effectively improves flexibility of adaption between the gamepad and the electronic devices.

It should be noted that a size of the opening is greater than a size of the interface 23, so as to ensure a movement range of the interface 23 and ensure that the location of the interface 23 relative to the housing 10 can be adjusted.

As shown in FIG. 2 to FIG. 6, the housing 10 includes a first housing 11 and a second housing 12, the first housing 11 and the second housing 12 are connected and enclose the accommodation space, the opening is provided in the first housing 11 and/or the second housing 12, the interface support 20 includes a support body 21, and the interface 23 is disposed on the support body 21.

In some embodiments, the first housing 11 and the second housing 12 may also be referred to as other alternative names such as an upper housing and a lower housing, or a face shell and a bottom cover. This is not specifically limited in this application. For example, the gamepad is a joypad, the first housing 11 may be provided operating devices such as a joystick and a button, and elements such as a circuit board and a power supply apparatus that are connected to the operating devices such as the joystick and the button are mounted in the housing 10, to be specific, in the accommodation space. For a specific connection relationship and operating principle thereof, refer to the related art. This is not described in detail in this application. In this embodiment of this application, the interface support 20 includes the support body 21 and a first elastic member 22, and the interface support 20 may be movably connected to the housing 10 through the first elastic member 22. For example, two ends of the first elastic member 22 are respectively connected to the support body 21 and the first housing 11, so that the support body 21 can move relative to the housing 10 based on extension and retraction of the first elastic member 22, and movement of the support body 21 can drive the interface 23 to move, to adjust the location of the interface 23. In this way, the gamepad can adapt to electronic devices of different models and thicknesses.

Figure 3A:
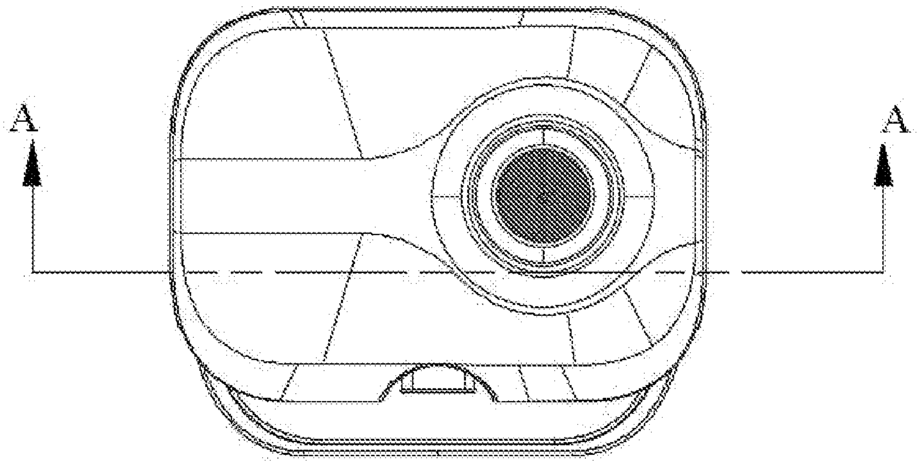
FIG. 3*a* is a first top view of a gamepad according to an embodiment of this application.
Figure 3B:
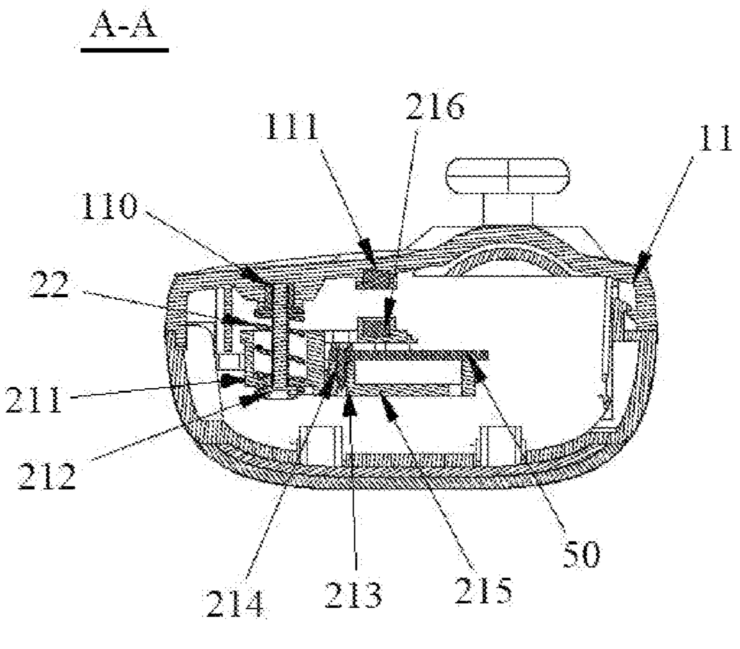
FIG. 3*b* is a cross-sectional view along A-A in FIG. 3*a;*
Figure 4A:
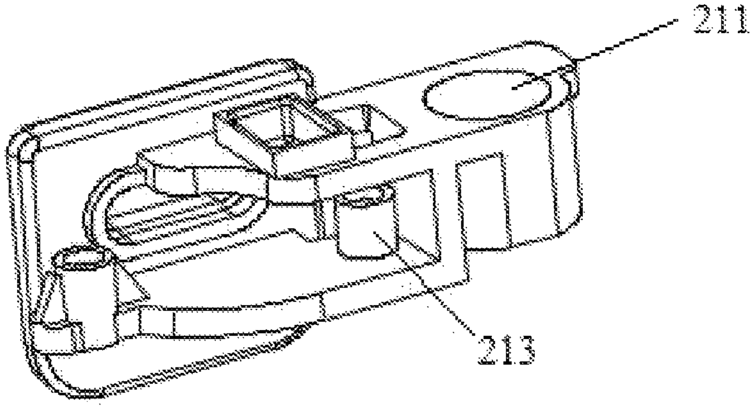
FIG. 4*a* is a first structural diagram of a support body in a gamepad according to an embodiment of this application.
Figure 4B:
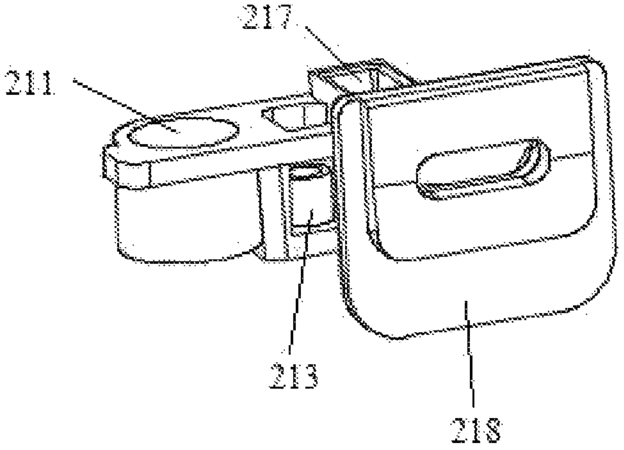
FIG. 4*b* is a second structural diagram of a support body in a gamepad according to an embodiment of this application.
Figure 5A:
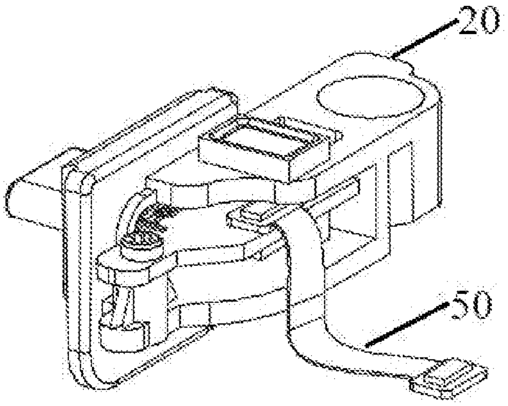
FIG. 5*a* is a first structural diagram of an interface support and an interface circuit board in a gamepad according to an embodiment of this application.
Figure 5B:
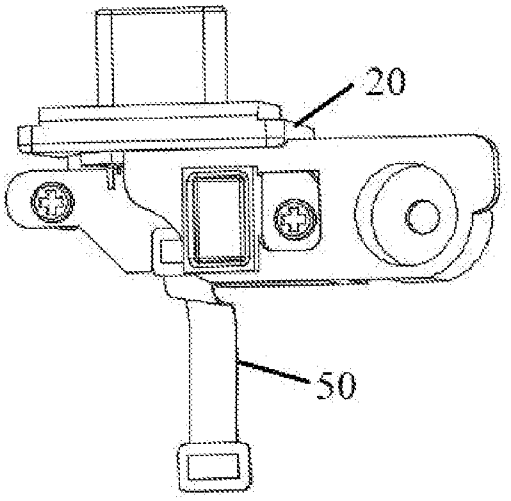
FIG. 5*b* is a second structural diagram of an interface support and an interface circuit board in a gamepad according to an embodiment of this application.
Figure 5C:
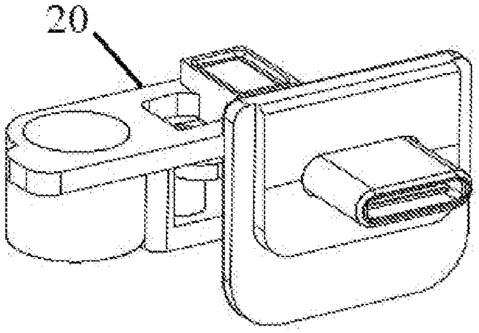
FIG. 5*c* is a third structural diagram of an interface support and an interface circuit board in a gamepad according to an embodiment of this application.

Specifically, as shown in FIG. 3*b*, the support body 21 includes a first mounting slot 211 and a first positioning portion 212, the first positioning portion 212 runs through the first mounting slot 211 and is connected to a target housing, there is a gap between a slot opening of the first mounting slot 211 and the target housing, the support body 21 is capable of moving along an extension direction of the first positioning portion 212, and the extension direction is in the same direction as the first direction. The target housing is the first housing 11 or the second housing 12, and the first direction is a direction in which the support body 21 is close to the target housing or away from the target housing.

For example, the target housing is the first housing 11, the first positioning portion 212 runs through the first mounting slot 211 on the support body 21 and is connected to the first housing 11, so that the support body 21 is connected to the first housing 11 through the first positioning portion 212. There is a gap between the slot opening of the first mounting slot 211 on the support body 21 and the first housing 11, and there is also a specific gap between the support body 21 and the first housing 11, to ensure that the support body 21 has movement space in the first direction. In this way, the support body 21 can move close to the first housing 11 or away from the first housing 11. The support body 21 may move based on holding the interface 23 by a user.

Optionally, the first positioning portion 212 includes a limiting member and a connecting rod, the connecting rod runs through the first mounting slot 211 and is connected to the target housing, the limiting member is connected to the connecting rod and is located on a side of the first mounting slot 211 back away from the target housing, and an extension direction of the connecting rod is in the same direction as the first direction.

For example, the target housing is the first housing 11, and the connecting rod may penetrate a slot bottom of the first mounting slot 211, extend out of the slot opening of the first mounting slot 211, and be fastened to a fastening base 110 on the first housing 11, so as to connect the support body 21 to the first housing 11 through the connecting rod. The limiting member is disposed at an end of the connecting rod away from the first housing 11, and the limiting member is located on a side of the slot bottom of the first mounting slot 211 back away from the first housing 11. When the support body 21 moves in a direction leaving the first housing 11 until the slot bottom of the first mounting slot 211 abuts against the limiting member, the support body 21 can no longer move in the direction leaving the first housing 11. This limits movement of the support body 21, to limit movement ranges of the support body 21 and the interface 23.

In this embodiment of this application, the interface support 20 may further include the first elastic member 22, the first elastic member 22 is accommodated in the first mounting slot 211, one end of the first elastic member 22 abuts against the target housing, the other end of the first elastic member 22 abuts against the slot bottom of the first mounting slot 211, and the end of the first elastic member 22 abutting against the target housing extends out of the support body 21.

As shown in FIG. 3*b*, for example, the target housing is the first housing 11. The first elastic member 22 is accommodated in the first mounting slot 211, two ends of the first elastic member 22 respectively abut against the slot bottom of the first mounting slot 211 and the first housing 11, and an end of the first elastic member 22 connected to the first housing 11 extends out of the support body 21, for example, extending out of the slot opening of the first mounting slot 211. In this way, there is still a specific distance between the support body 21 and the first housing 11, which can ensure that the support body 21 can move close to the first housing 11 or away from the first housing 11 based on extension and retraction of the first elastic member 22, so as to ensure that the support body 21 and the interface 23 can reciprocate. During specific practical application, the first elastic member 22 is disposed, so that the support body 21 is not fixed in the housing 10, and a user may apply a force to the interface 23 to drive the support body 21 to move.

In this embodiment of this application, the support body 21 may be further provided with a first magnetic member 216, the target housing is provided with a second magnetic member 111, and the first magnetic member 216 and the second magnetic member 111 magnetically repel each other. For example, the target housing is the first housing 11. To ensure a movement range of the support body 21, there is a specific distance between the support body 21 and the first housing 11. After the support body 21 moves close to the first housing 11 through compression of the first elastic member 22, the support body 21 cannot necessarily return to an original location. However, the first magnetic member 216 and the second magnetic member 111 that magnetically repel each other are disposed, so that a force for driving movement away from the first housing 11 can be provided for the support body 21, to ensure that the support body 21 can return to the original location.

A location to which the support body 21 can return may be determined based on the first positioning portion 212. For example, the first positioning portion 212 is a bolt, the bolt passes through the first mounting slot 211 and is fastened to the first housing 11, a location of the bolt relative to the first housing 11 is fixed, and the first elastic member 22 is sleeved on the bolt. A user may apply a force to the interface 23 to drive the support body 21 to press against the first elastic member 22 to move close to the first housing 11. After the force applied to the interface 23 is released, the support body 21 is driven by a repulsive magnetic force between the first magnetic member 216 and the second magnetic member 111 to move in a direction leaving the first housing 11, until the bottom of the first mounting slot 211 abuts against a nut (namely, the limiting member) of the bolt. In this way, the support body 21 returns to the original location.

It should be noted that a small-sized gamepad, for example, a gamepad adapting to a mobile phone, has small internal space, and the first elastic member 22 has a small extension and retraction range and a small elastic force. The first magnetic member 216 and the second magnetic member 111 are disposed, so that a force for returning to the original location can be provided for the support body 21. This better helps the support body 21 return to the original location, to ensure that the support body 21 and the interface 23 move more flexibly to adjust the location of the interface 23.

Optionally, a distance between the first magnetic member 216 and the second magnetic member 111 is a first distance, a distance between the slot opening of the first mounting slot 211 and a target location on the target housing is a second distance, and the first distance is greater than the second distance. The target location is a location of an orthographic projection of the slot opening of the first mounting slot 211 on the target housing, or is a location at which the first elastic member 22 abuts against the target housing.

For example, the target housing is the first housing 11. The first magnetic member 216 and the second magnetic member 111 magnetically repel each other, and a shorter distance between the first magnetic member 216 and the second magnetic member 111 indicates a larger repulsive magnetic force. A distance between the slot opening of the first mounting slot 211 and a location at which the first elastic member 22 abuts against the first housing 11 is less than the distance between the first magnetic member 216 and the second magnetic member 111. This can avoid a case that a magnetic force between the first magnetic member 216 and the second magnetic member 111 is excessively large and consequently, it is difficult for the support body 21 to move close to the first housing 11, and avoid a case that a user needs to apply a large force to the interface 23 to drive the support body 21 to press against the first elastic member 22. In addition, if the first magnetic member 216 is close to the second magnetic member 111, a force between the first magnetic member 216 and the second magnetic member 111 is likely to cause deviation of the support body 21. The first magnetic member 216 and the second magnetic member 111 are limited to have a specific distance, to avoid instability of the support body 21 due to deviation.

Optionally, the support body 21 is provided with a magnetic member mounting slot 217 for mounting the first magnetic member 216, and the first magnetic member 216 may be bonded to the magnetic member mounting slot 217 or connected to the magnetic member mounting slot 217 through an interference fit, to ensure stability of the first magnetic member 216.

In this embodiment of this application, the gamepad includes a circuit board 50, the support body 21 includes an interface mounting slot 215, a second mounting slot 213, and a second positioning member 214, the circuit board 50 is located in a slot opening of the interface mounting slot 215 and extends into the interface 23, and the second positioning member 214 runs through the circuit board 50 and is fastened in the second mounting slot 213. Optionally, the second mounting slot 213 may be adjacent to the interface mounting slot 215, and the second positioning member 214 runs through the circuit board 50 to fasten the circuit board 50 to the interface support 20, so that the gamepad communicates with the electronic device through the circuit board 50 when the gamepad is plugged into the electronic device. The circuit board 50 may be a flexible printed circuit board.

Figure 6:
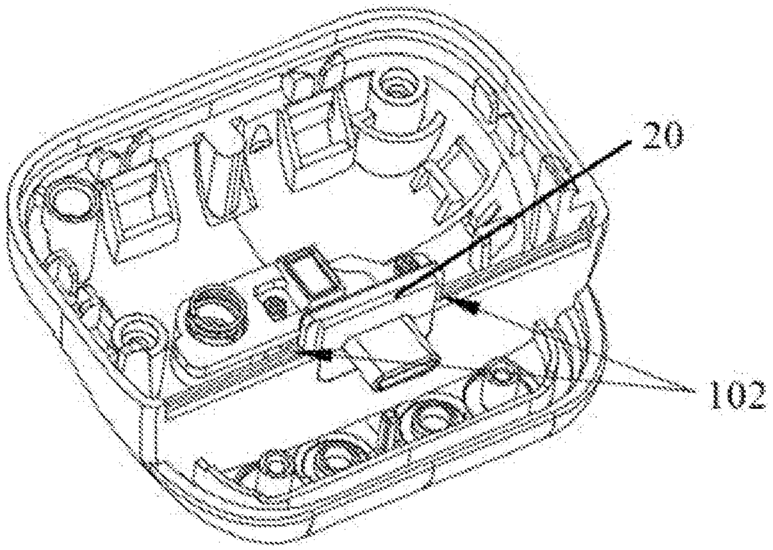
FIG. 6 is a first structural diagram of a second housing in a gamepad according to an embodiment of this application.

As shown in FIG. 6 and FIG. **10*b*, the first housing 11 or the second housing 12 is provided with a clamping slot 102, the clamping slot 102 forms the opening, the interface support 20 is disposed in the clamping slot 102 and is capable of moving in the first direction relative to clamping slot 102, and the first direction is in the same direction as a depth direction of the clamping slot 102. It should be noted that the support body 21 may be connected to the clamping slot 102 through fitting, but this does not limit movement of the support body 21. The support body 21 is capable of moving in the depth direction of the clamping slot 102 relative to the clamping slot 102, to ensure that the interface 23 on the support body 21** can adapt to different models of electronic devices.

Optionally, a panel 218 is disposed on a side of the support body 21 facing the clamping slot 102, the interface 23 is disposed on the panel 218, and a size area of the panel 218 is larger than an opening area of the clamping slot 102, so that the panel 218 can seal the clamping slot 102 to protect the internal accommodation space of the housing 10 against water and dust.

Figure 2:
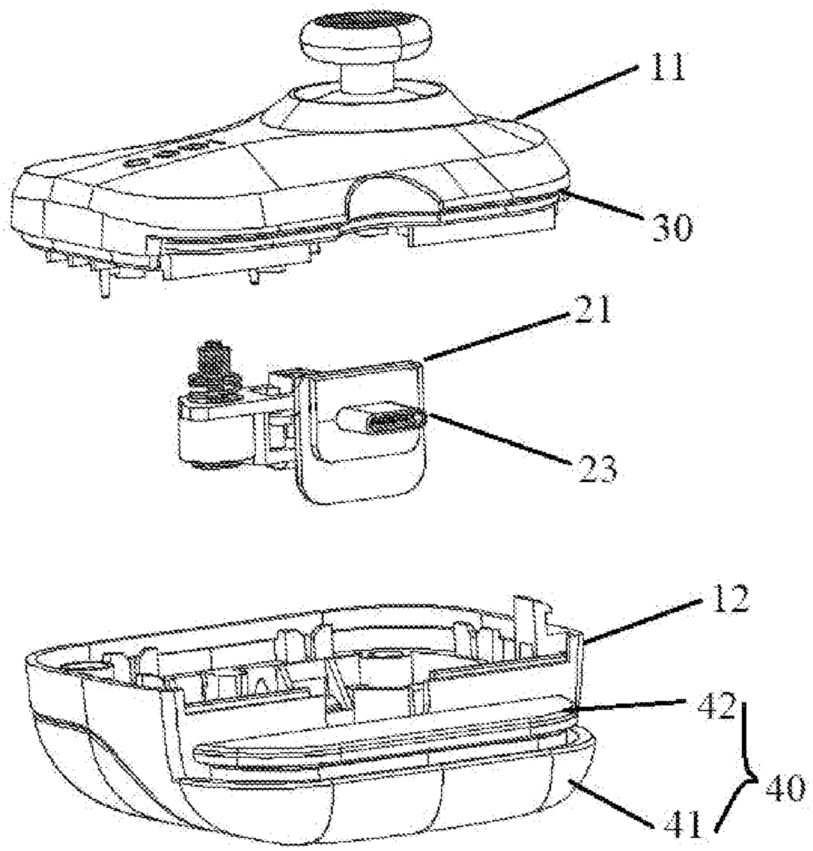
FIG. 2 is an exploded view of a gamepad according to an embodiment of this application.
Figure 10A:
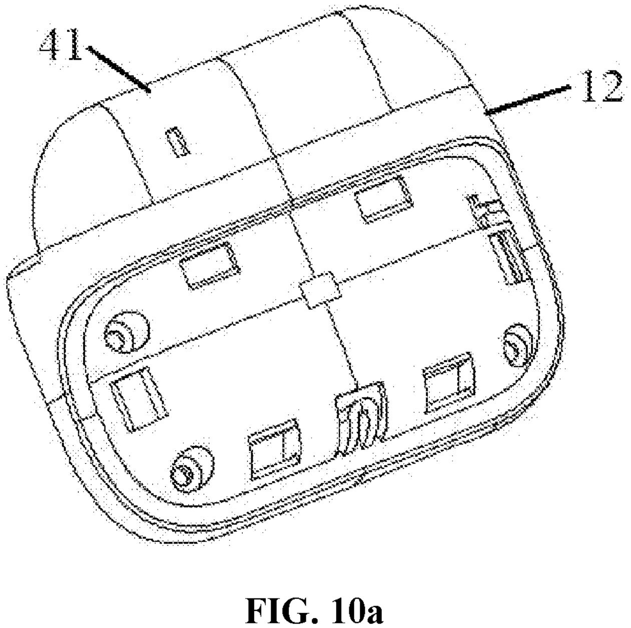
FIG. 10*a* is a second structural diagram of a second housing in a gamepad according to an embodiment of this application.
Figure 10B:
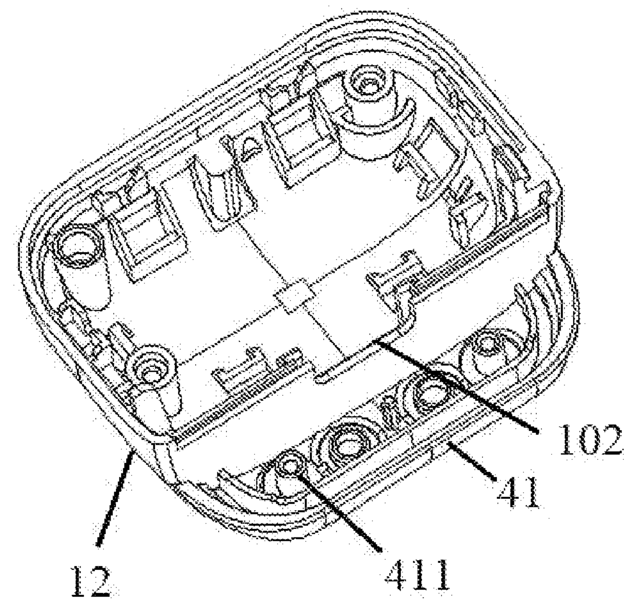
FIG. 10*b* is a third structural diagram of a first housing in a gamepad according to an embodiment of this application.

Further, as shown in FIG. 2 and FIG. **7*a* to FIG. 10*b*, a side of the housing 10 provided with the opening is further provided with a first clamping portion 30 and a second clamping portion 40 that protrude in a same direction, and the interface 23 is located between the first clamping portion 30 and the second clamping portion 40. The second clamping portion 40 includes a fastening portion 41 and a movable portion 42. The movable portion 42 is capable of moving in a direction towards or away from the fastening portion 41. The first clamping portion 30 and the movable portion 42 clamp the electronic device in a case that the gamepad is plugged into the electronic device through the interface 23. It can be understood that the movable portion 42 is capable of moving relative to the fastening portion 41, in other words, a location of the movable portion 42 is adjustable, so that a distance between the movable portion 42 and the first clamping portion 30 is adjustable. In this way, the movable portion 42 and the first clamping portion 30** can clamp electronic devices of different thicknesses. This better helps the gamepad adapt to electronic devices of different models and thicknesses, and further improves stability of connection between the gamepad and the electronic device, preventing the gamepad from easily falling off the electronic device.

Optionally, the movable portion 42 includes a movable plate 421 and a second elastic member 422, the movable plate 421 is located on a side of the fastening portion 41 facing the first clamping portion 30, one end of the second elastic member 422 abuts against the fastening portion 41, and the other end of the second elastic member 422 abuts against a side of the movable plate 421 facing the fastening portion 41. It can be understood that two ends of the second elastic member 422 may be respectively connected to the movable plate 421 and the fastening portion 41, and the movable plate 421 is capable of moving close to or away from the fastening portion 41 based on extension and retraction of the second elastic member 422, to adjust a distance between the movable plate 421 and the first clamping portion 30. In this way, electronic devices of different thicknesses can be clamped.

It should be noted that a direction in which the second elastic member 422 extends and retracts is consistent with a direction in which the first elastic member 22 extends and retracts. Therefore, a direction in which the movable plate 421 moves is also consistent with a direction in which the interface 23 moves. For example, both the movable plate 421 and the interface 23 can reciprocate up and down.

Optionally, the fastening portion 41 is provided with an accommodation slot, the accommodation slot is provided with a limiting post 411 and a fastening member 412, the movable plate 421 is disposed in a slot opening of the accommodation slot, a third mounting slot 423 is further provided on a side of the movable plate 421 facing the accommodation slot, the limiting post 411 is embedded into the third mounting slot 423, and the fastening member 412 is inserted into the limiting post 411 through the third mounting slot 423 to prevent the third mounting slot 423 from detaching from the limiting post 411. In a case that the movable plate 421 moves based on extension and retraction of the second elastic member 422, the movable plate 421 drives the third mounting slot 423 to move in an extension direction of the limiting post 411.

For example, the limiting post 411 is disposed at a slot bottom of the accommodation slot formed by the fastening portion 41, the movable plate 421 is located at the slot opening of the accommodation slot, and the two ends of the second elastic member 422 are respectively connected to the movable plate 421 and the slot bottom of the accommodation slot, so that the movable plate 421 can reciprocate based on extension and retraction of the second elastic member 422. A side of the movable plate 421 is provided with the third mounting slot 423 that extends into the accommodation slot, and the fastening member 412 is inserted into the limiting post 411 through the third mounting slot 423, to connect the movable plate 421 to the limiting post 411. The limiting post 411 is embedded in the third mounting slot 423. The third mounting slot 423 includes specific in-slot space 420. The top of the fastening member 412 is not in contact with the movable plate 421. Therefore, when the movable plate 421 moves close to the slot bottom of the accommodation slot, because there is still a specific distance (namely, the in-slot space 420) between the top of the fastening member 412 and the movable plate 421, the fastening member 412 does not resist the movable plate 421, so that the movable plate 421 can move close to the slot bottom of the accommodation slot. In addition, when the movable plate 421 moves away from the slot bottom of the accommodation slot, the fastening member 412 can prevent the third mounting slot 423 from detaching from the limiting post 411, to limit and restore movement of the movable plate 421, and prevent the movable plate 421 from detaching from the fastening portion 41.

Figure 7A:
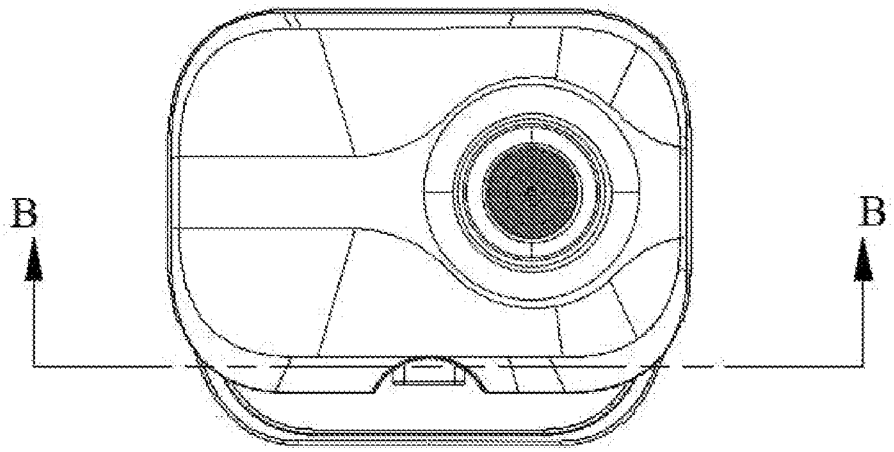
FIG. 7*a* is a second top view of a gamepad according to an embodiment of this application.
Figure 7B:
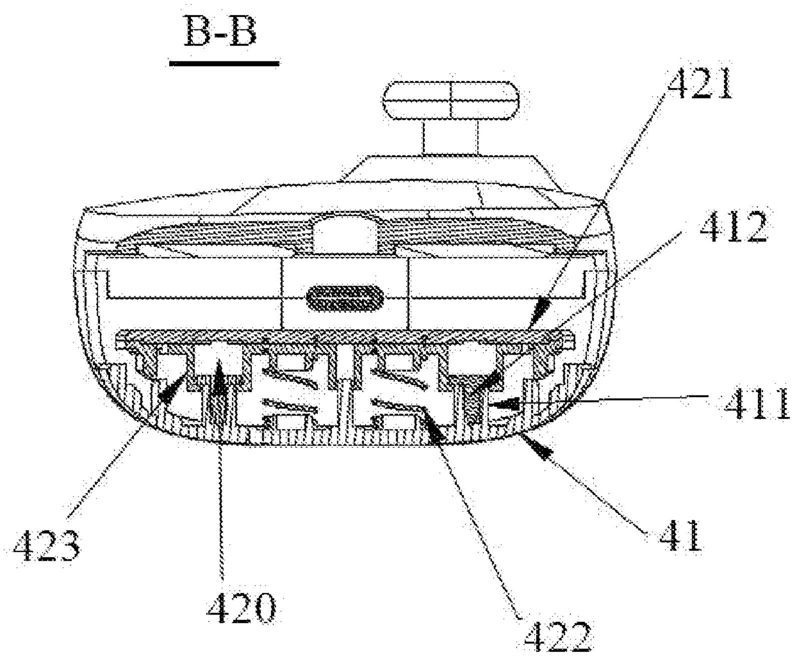
FIG. 7*b* is a cross-sectional view along B-B in FIG. 7*a;*
Figure 8:
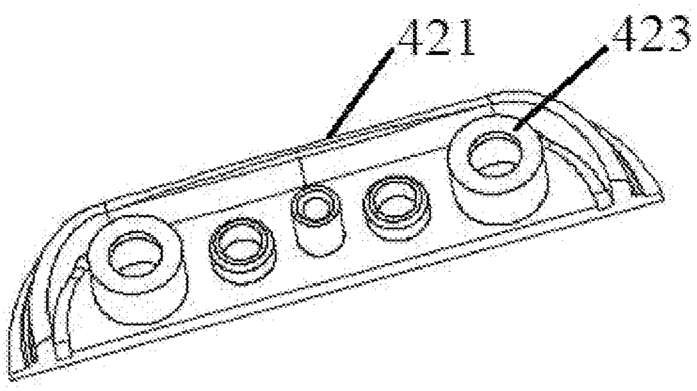
FIG. 8 is a structural diagram of a movable plate in a gamepad according to an embodiment of this application.
Figure 9A:
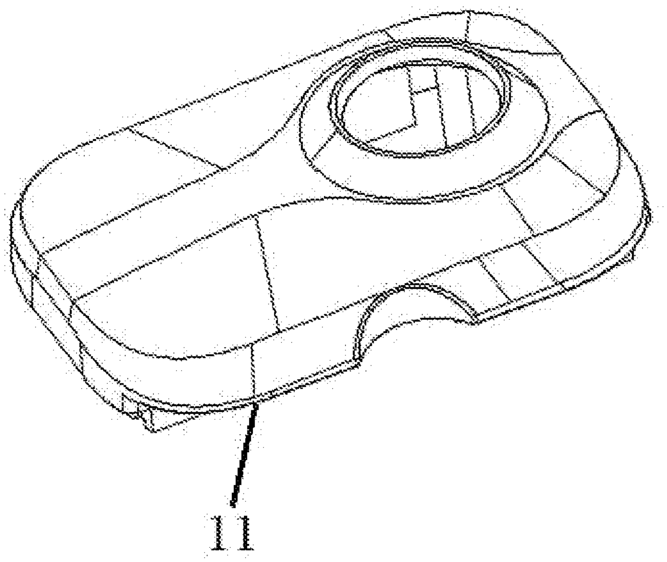
FIG. 9*a* is a first structural diagram of a first housing in a gamepad according to an embodiment of this application.
Figure 9B:
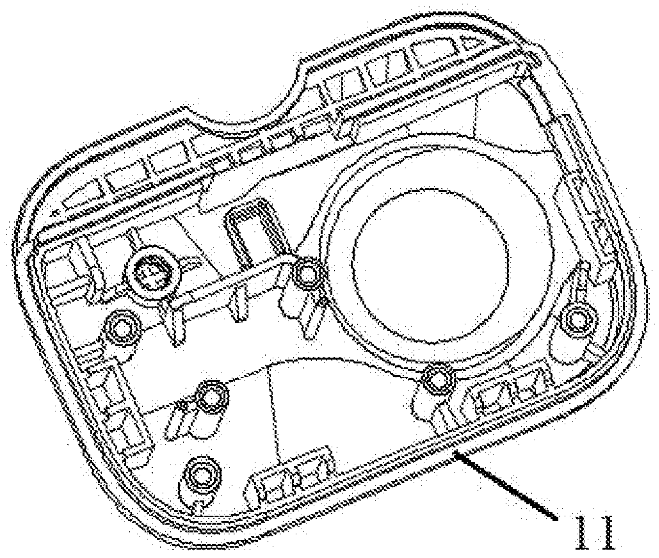
FIG. 9*b* is a second structural diagram of a first housing in a gamepad according to an embodiment of this application.

Optionally, the slot opening of the third mounting slot 423 is provided with a first baffle plate connected to a slot wall, the first baffle plate is provided with a connecting hole, the fastening member 412 runs through the connecting hole and is inserted into the limiting post 411, the fastening member 412 includes a second baffle plate accommodated in the third mounting slot 423 and protruding out of the limiting post 411, and the second baffle plate abuts against the first baffle plate. For example, specifically, as shown in FIG. 7*b*, the fastening member 412 is a bolt, a nut of the bolt is the second baffle plate, and a size of the nut is greater than a size of the connecting hole on the first baffle plate. Therefore, when the movable plate 421 moves in a direction leaving the slot bottom of the accommodation slot until the first baffle plate abuts against the nut, resistance applied by the nut to the first baffle plate can prevent the third mounting slot 423 from detaching from the limiting post 411, and can also limit further movement of the movable plate 421, so that the movable plate 421 returns to an original location.

Optionally, a side of the movable plate 421 facing the first clamping portion 30 is provided with a soft pad, for example, a silicone pad, to avoid damage to the electronic device when the electronic device is clamped by the gamepad.

The electronic device in the embodiments of this application includes but is not limited to terminal products into which the gamepad can be plugged, for example, a mobile phone, a tablet computer, and a smart wearable device.

The foregoing describes the embodiments of this application with reference to the accompanying drawings. However, this application is not limited to the foregoing specific implementations. The foregoing specific implementations are merely examples, but are not limitative. Inspired by this application, persons of ordinary skill in the art may further make many modifications without departing from the purposes of this application and the protection scope of the claims, and all the modifications shall fall within the protection scope of this application.

What is claimed is:

1. A gamepad, comprising:

a housing, wherein the housing is provided with an accommodation space, the housing is provided with an opening, and the opening communicates with the accommodation space; and an interface support, wherein the interface support is accommodated in the accommodation space and is movably connected to the housing, the interface support is provided with an interface for plugging into an electronic device, and the interface protrudes out of the housing through the opening, wherein the interface support is capable of moving in a first direction relative to the housing to drive the interface to move in the first direction, wherein the first direction is perpendicular to a protruding direction of the interface;

wherein the housing comprises a first housing and a second housing, the first housing and the second housing are connected and enclose the accommodation space, and the opening is provided in the first housing and/or the second housing; and the interface support comprises a support body, and the interface is disposed on the support body.

2. The gamepad according to claim 1, wherein the support body comprises a first mounting slot and a first positioning portion, the first positioning portion runs through the first mounting slot and is connected to a target housing, there is a gap between a slot opening of the first mounting slot and the target housing, the support body is capable of moving along an extension direction of the first positioning portion, and the extension direction is in the same direction as the first direction, wherein the target housing is the first housing or the second housing, and the first direction is a direction in which the support body is close to the target housing or away from the target housing.

3. The gamepad according to claim 2, wherein the first positioning portion comprises a limiting member and a connecting rod, the connecting rod runs through the first mounting slot and is connected to the target housing, the limiting member is connected to the connecting rod and is located on a side of the first mounting slot back away from the target housing, and an extension direction of the connecting rod is in the same direction as the first direction.

4. The gamepad according to claim 2, wherein the interface support comprises a first elastic member, the first elastic member is accommodated in the first mounting slot, one end of the first elastic member abuts against the target housing, the other end of the first elastic member abuts against a slot bottom of the first mounting slot, and the end of the first elastic member abutting against the target housing extends out of the support body.

5. The gamepad according to claim 2, wherein the support body is provided with a first magnetic member, the target housing is provided with a second magnetic member, and the first magnetic member and the second magnetic member magnetically repel each other.

6. The gamepad according to claim 5, wherein a distance between the first magnetic member and the second magnetic member is a first distance, a distance between the slot opening of the first mounting slot and a target location on the target housing is a second distance, and the first distance is greater than the second distance, wherein the target location is a location of an orthographic projection of the slot opening of the first mounting slot on the target housing.

7. The gamepad according to claim 2, wherein the gamepad comprises a circuit board, the support body comprises an interface mounting slot, a second mounting slot, and a second positioning member, the circuit board is located in a slot opening of the interface mounting slot and extends into the interface, and the second positioning member runs through the circuit board and is fastened in the second mounting slot.

8. The gamepad according to claim 1, wherein the first housing or the second housing is provided with a clamping slot, the clamping slot forms the opening, the interface support is disposed in the clamping slot and is capable of moving in the first direction relative to the clamping slot, and the first direction is in the same direction as a depth direction of the clamping slot.

9. The gamepad according to claim 1, wherein a side of the housing provided with the opening is provided with a first clamping portion and a second clamping portion that protrude in a same direction, and the interface is located between the first clamping portion and the second clamping portion, wherein the second clamping portion comprises a fastening portion and a movable portion, the movable portion is capable of moving in a direction towards or away from the fastening portion, and the first clamping portion and the movable portion clamp the electronic device in a case that the gamepad is plugged into the electronic device through the interface.

10. The gamepad according to claim 9, wherein the movable portion comprises a movable plate and a second elastic member, the movable plate is located on a side of the fastening portion facing the first clamping portion, one end of the second elastic member abuts against the fastening portion, and the other end of the second elastic member abuts against a side of the movable plate facing the fastening portion.

11. The gamepad according to claim 10, wherein the fastening portion is provided with an accommodation slot, the accommodation slot is provided with a limiting post and a fastening member, the movable plate is disposed in a slot opening of the accommodation slot, a third mounting slot is further provided on a side of the movable plate facing the accommodation slot, the limiting post is embedded into the third mounting slot, and the fastening member is inserted into the limiting post through the third mounting slot to prevent the third mounting slot from detaching from the limiting post, wherein in a case that the movable plate moves based on extension and retraction of the second elastic member, the movable plate drives the third mounting slot to move in an extension direction of the limiting post.

12. The gamepad according to claim 11, wherein the slot opening of the third mounting slot is provided with a first baffle plate connected to a slot wall, the first baffle plate is provided with a connecting hole, the fastening member runs through the connecting hole and is inserted into the limiting post, the fastening member comprises a second baffle plate accommodated in the third mounting slot and protruding out of the limiting post, and the second baffle plate abuts against the first baffle plate.

* * * * *